Aug. 29, 1933.    C. C. THOMAS    1,924,139
PHOTO-ELECTRIC CONTROL APPARATUS
Filed Jan. 18, 1932
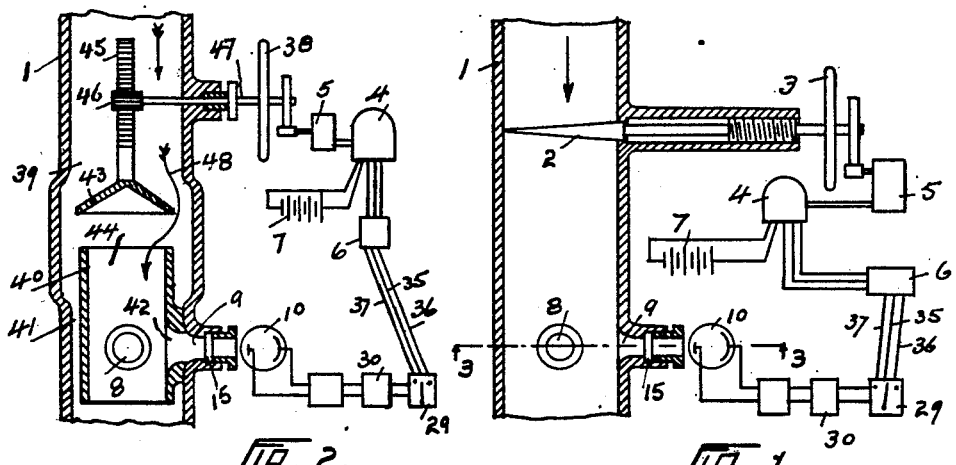
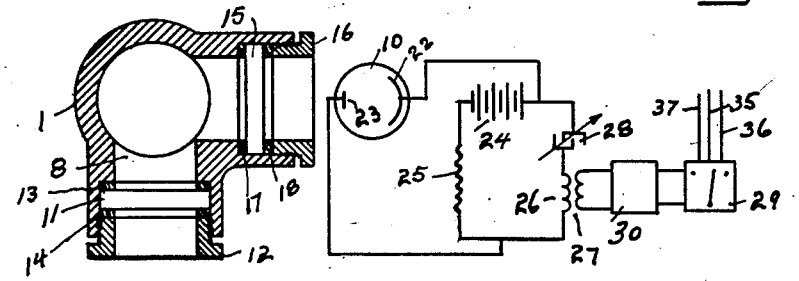
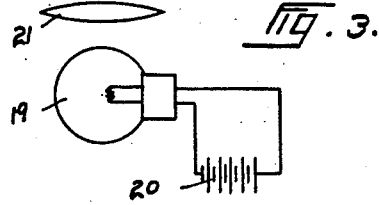
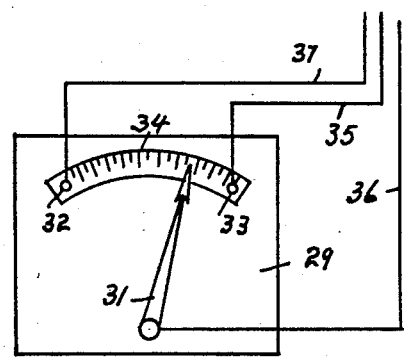
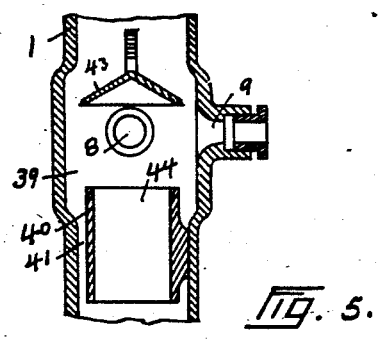
INVENTOR.
Carl C. Thomas Patented Aug. 29, 1933

1,924,139

UNITED STATES PATENT OFFICE 1,924,139

PHOTO-ELECTRIC CONTROL APPARATUS

Carl C. Thomas, Pasadena, Calif.

Application January 18, 1932. Serial No. 587,391

11 Claims. (Cl. 122—459)

This invention relates to an apparatus by which operable mechanical means may be controlled through the combined use of light and electricity. The present description is more directly applied to the control of mechanical means for regulating steam flow or pressure, or both, the object being to separate and remove the water from the steam.

In the present embodiment of my invention, a photo-electric means is employed to control a steam valve, or other device, by means of which the flow of steam is regulated by and in accordance with the amount of light reflected or refracted by globules of water in steam, and also manually operated means which may be used for the same purpose.

I have found that where a valve of suitable construction, such as a gate valve, is used to limit the flow of steam in a conduit, the amount of water globules carried by the stream of steam, as distinguished from the water entrained on the inner surface of the conduit, varies as the opening of the valve is made greater or less, all other conditions remaining constant, and the actual state or condition of the water varies. If a valve is fully open so that steam may flow through unrestricted, no free water may be apparent in the flowing steam, but if the valve is closed, sufficiently to restrict the passage of steam, globules of water will appear in the steam after it has left the valve. If the valve is opened to its fullest capacity, the water may disappear from the stream of steam and appear as a flow of water on the wall of the conduit. The water may appear in the form of large globules or as a fine mist or fog, as the opening through the valve is made more or less.

I have also found that when steam carrying some free water is flowing through a pipe, some of the water becomes entrained upon the walls of the pipe and may move along under the frictional urge of the flowing steam. When this entrained water comes to an obstacle, such as a valve or other device, it may leave the walls of the pipe and be dispersed through the current of flowing steam. It may be important to return the water to the walls of the pipe. I employ a means for this purpose which I will presently explain. Such a device, or a valve or like device, may require adjustment and regulation to meet changing conditions or changing quantities of water. It is an object of the present invention to provide means by which such a device may be actuated as may be suitable to the required conditions, either manually or by means made operable by and in accordance with the relative amount of water carried by the steam as compared with that carried on the walls of the conduit.

Other objects within the contemplation of the present invention are to provide a device which is compact and easily installed, simple and inexpensive in construction, that may be manually adjusted, or that will function to control and regulate moving fluids, liquids or material, whereby light reflected or refracted from such fluid, liquid or material may be utilized as a controlling agent.

Other objects and advantages of my invention will become more apparent from the following specifications when considered in connection with the accompanying drawing, in which:

Fig. 1 is a general, partially diagrammatic, arrangement of my invention as applied to a steam conduit having a gate valve operated by hand or by a motor and control switch, Fig. 2 is a partially diagrammatic arrangement of a steam conduit having therein a means for changing the flow of steam through the conduit in a manner to direct the free water in the steam towards the walls of the conduit.

Fig. 3 is a cross section through the conduit at 3—3 of Fig. 1, showing the arrangement of the means of introducing light into the conduit and its direction to the photo-electric cell. Fig. 3 also illustrates more in detail the arrangement of devices.

Fig. 4 illustrates more in detail the arrangement of a frequency-responsive meter or other device, by means of which circuits may be made or broken, and Fig. 5 is a modified arrangement of the device as illustrated in Fig. 2, in which the light opening and observation opening are differently arranged and disposed.

In my application for Letters Patent filed July 13, 1931, Serial No. 550,516, I have illustrated a system by means of which light is admitted to a steam conduit and any water present is illuminated. In the present invention a similar system is used for the purpose of observing the presence and amount of water in the steam, and providing means whereby light reflected or refracted by the water may fall upon a light-sensitive cell.

Referring to the drawing with more particularity, the steam flows in a conduit 1 in the direction indicated by the arrow. In Fig. 1 a gate valve 2 is disposed in a manner so that by it the conduit 1 may be closed and the passage of steam interrupted. The valve 2 is movable by means of a hand wheel 3 or by an electric motor 4 and gears 5. The motor 4 is controlled by a control switch 6, in a manner well known in this art, and receives energy from a source as at 7. In the steam conduit at a point below the valve 2 is an opening 8 closed by a transparent disc, as of glass. At an angle to the opening 8 is an opening 9 likewise closed by a transparent disc through light reflected or refracted from within the steam conduit may be observed or may fall upon a light-sensitive cell 10. The construction of this device is more clearly illustrated in Fig. 3, which shows how the transparent disc 11 may be fitted in the opening 8 and held by the gland 12 and the packing washers 13 and 14. In like manner, the transparent disc 15 may be held in place by the gland 16 and the packing washers 17 and 18. Before the opening 8 a lamp 19 is so disposed that rays of light from the lamp may pass through the transparent disc 11 to the interior of the steam conduit. Rays of light thus entering the steam conduit will illuminate the interior and fall upon any globules of water which may pass the opening and be reflected or refracted by the globules of water and pass out through the opening 9 to the eye of an observer or to fall upon the light-sensitive cell 10. The lamp 19 receives energy from a suitable source of energy, as 20, and the rays of light may be directed or more definitely concentrated by a lens 21.

An operator may, through the opening 9, observe the presence and amount of water present in the conduit, and by means of the hand wheel 3 adjust the valve 2 to regulate the flow of steam to produce required results.

In my application for Letters Patent filed July 13, 1931, Serial No. 550,516, I describe an electrical means whereby the presence and variations in amount of water globules in the steam might be made apparent by reflected or refracted light. In the present invention, I employ a similar device as a means whereby the variable amount of light reflected or refracted from the globules of water in the steam passing through the conduit may cause a controlling device to be actuated.

The device chosen for this purpose consists of a suitable photo-electric cell 10 having a light-sensitive, electron-emitting cathode 22, and an anode 23, and used as a source of oscillation, is placed before the opening 9 where the light rays from the lamp 19 which are refracted or reflected by globules passing the light may fall upon the cell. The cell is connected to a source of potential 24 through the resistance 25. Connected in shunt to the terminals of the cell 19 is the primary winding 26 of the transformer 27, and a condenser 28. The condenser 28 may be variable as shown and can be used to control the frequency of oscillation between certain limits. The transformer 27 is used to couple the oscillatory circuit to a frequency-responsive device 29 through an alternating current amplifier 30 of any suitable type. In the drawing, Fig. 3, the frequency-responsive device is shown as a modified frequency meter having a swinging arm 31 and two contact terminals 32 and 33 with either of which the arm 31 may make contact in its movement across the dial 34. The contact terminal 32 may indicate a point to which the arm 31 may swing when the frequency of oscillation set up by the cell 10 is low and the contact terminal 33 may indicate a point to which the arm 31 may swing when the frequency of oscillation set up by the cell 10 is high. Whether the frequency of oscillation is high or low is determined by the amount of light falling upon the cell 10, and the amount of light falling upon the cell 10 is limited by the amount of water globules in the steam passing the opening 9 by which light may be reflected or refracted to the cell. Thus the swing of the arm 31 across the dial 34 to contact the terminal 32 or the terminal 33 is dependent upon the amount of water globules passing with the steam along the conduit and past the opening 9.

From the contact terminal 32 a conductor 35 is carried to the control switch 6, also a conductor 36 from the contact terminal 33 and a conductor 37 from the arm 31. When the arm 31 swings to contact the terminal 33, a circuit through the conductors 36 and 37 is closed which operates the control switch 6 to close a circuit with the motor 4 to start the motor in the direction to open the valve 2. Through the means of the reduction gear 5, the valve moves slowly and as the valve opens the water in the steam passing through the valve will gradually disappear. As the water disappears, less light will be reflected or refracted to the cell 10 causing a decrease in the frequency of oscillation in the cell circuit with a resultant change in the frequency meter 29, and the arm 31 of the frequency meter 29 will swing away from the contact terminal 33 breaking the circuit through the conductors 36 and 37 by which the control switch 6 is deenergized and made inoperative, thus breaking the motor circuit and deenergizing the motor. When the motor has stopped, the valve will remain without further opening or closing until a circuit is again closed by the movement of the arm 31. When the arm 31 moves to contact the terminal 32, the same action takes place except that the circuit through the conductors 35 and 37 is closed and a corresponding reverse circuit is closed through the action of the control switch 6 to operate the motor 4 in the reverse direction and tends to close the valve 2.

In Fig. 2 a similar arrangement is made, except that the device is constructed and adapted to operate a water separator disposed in a chamber 39 below which is arranged a sleeve 40, the sleeve being less in diameter than the conduit 1, and forming a space 41 between the sleeve and the walls of the conduit. The sleeve 40 preferably projects into the chamber 39 and is attached to the wall of the conduit. An opening 42 is provided in the sleeve 40 to communicate with the opening 9, and likewise an opening to communicate with the opening 8, so that light may pass through the openings 8 and 9 as hereinbefore described. Around each opening the sleeve 40 is bossed to fit closely against the walls of the conduit to prevent water from creeping along the walls of the pipe and entering the openings 8 and 9.

In Fig. 5, a modified arrangement is shown in which the openings 8 and 9 communicate directly with the chamber 39 but, in which the operation and function of the various parts are the same as described and illustrated in Fig. 2.

A deflector 43 is adjustably suspended above the end of the sleeve 40 in a manner to close the passage 44 through the sleeve 40 when the deflector 43 is lowered upon the sleeve. Means is provided by which the deflector 43 may be raised or lowered. A means is diagrammatically suggested in Fig. 2, consisting of a rack 45 and a pinion 46, the pinion 46 mounted on a shaft 47 which extends through an opening in the wall of the conduit and is packed in a suitable manner, as by means of gasket and gland. The shaft 47 may be rotated by means of a hand wheel 38 or 4 and a reducing gear 5 in a manner similar to that illustrated in Fig. 1 and before described.

The action of the deflector is to turn the current of flowing steam toward the walls of the conduit in a manner to direct any globules of water toward the walls of the conduit. The steam follows a course indicated by the direction arrow 48, turning sharply under the deflector 40 and passing down the passage 44. Any globules of water in the steam will be carried by their inertia out against the walls of the conduit and down along the walls of the conduit into the space 41 between the sleeve 40 and the wall of the conduit. Any water not thus separated from the steam will pass the openings 8 and 9 with the steam and thus come into position to reflect light to the cell 10. If the deflector 43 is far removed from the sleeve 40, the steam will not be forced to turn at a very sharp angle to enter the passage and will carry with it some water, but if the deflector 43 is forced down close to the opening into the sleeve, the steam is forced to turn at a sharp angle to enter the passage and the speed of the moving steam will be increased by reason of the reduced passage between the sleeve and the deflector, which will tend to separate more of the water from the steam. As the amount of water passing down the passage 44 increases, increased reflected light will fall upon the cell 10 to increase the frequency of oscillation in the cell circuit and cause a deflection of the arm 31 by which a circuit will be closed to operate the motor 4 in a manner previously described, and cause the motor to lower the deflector 43.

Many applications of the present invention may be made for many purposes and I, therefore, do not limit my invention in its application, or construction, as it is understood that modifications may be made without departing from the spirit or sacrificing any of the advantages of the present invention and I, therefore, include any modifications or changes which may be made within the scope of my invention and as set forth in the appended claims.

What I claim is:—

1. A photo-electric control device to control and regulate the flow of steam to effect a change in the amount of water carried by said steam comprising, a steam conduit, an operable steam separating means in said conduit, means to actuate said separating means, including an electric motor, and electrical means to control the operation of said motor, including a photo-electric cell arranged to receive and be influenced by light reflected from water globules in said steam when said globules are subjected to illumination, and a frequency responsive device in operative relation to said cell and by means of which, through a motor control switch, said motor is energized to operate in one direction to close said separator and increase the amount of water separated from the steam, or in the reverse direction to open said separator, to remove more or less water from the steam as the amount of illuminated water globules varies and the light reflected therefrom to said cell varies.

2. A photo-electric control device to control and regulate the amount of water in steam comprising, a steam conduit, a steam separating means in said conduit by means of which water is separated from the steam, means to actuate said separating means including an electric motor, and electrical means to control the operation of said motor by and in accordance with the amount of light reflected or refracted from within said conduit including, a lamp and a photo-electric cell constructed and arranged to receive reflected or refracted rays of light from globules of water in said steam when subjected to illumination and a frequency responsive device operatively connecting said cell with said motor whereby, through a control switch, the motor is energized to operate said separating means in one direction as the light reflected to said photoelectric cell increases to separate more water from the steam or in the reverse direction to separate less as the amount of illuminated water globules varies and the light reflected therefrom to said photoelectric cell varies.

3. A photo-electric control device to control and regulate the amount of water in steam comprising, a steam conduit, a steam separating means in said conduit by means of which water is separated from the steam, means to actuate said separating means including an electric motor, and electrical means adapted to control the operation of said motor including, a lamp to illuminate the interior of said conduit, a photo-electric cell constructed and arranged to receive light reflected or refracted from within said conduit, and a frequency-responsive device made operable by and in accordance with the amount of light falling upon said cell to close or open the electric energy circuit to said motor to operate in a forward or reverse direction to increase or decrease the amount of water separated from the steam as the amount of light reflected to the cell from within said conduit increases or decreases.

4. In a photo-electric control device, the combination with a conduit having steam flowing therethrough, of an operable means in said conduit to separate water from steam, an electric motor to operate said means, and means to control the operation of said motor, including a lamp and a photo-electric cell constructed and arranged to receive light reflected or refracted from water within said conduit and operably connected in circuit with a frequency responsive device constructed and arranged to control the operation of said motor whereby said motor operates the water separating means to increase the water separated as the light reflected to the cell increases and decrease the amount of water separated as the light reflected to said cell decreases.

5. In a photo-electric control device, the combination with a conduit having steam flowing therethrough, of an operable means in said conduit to effect a change in the water content of the steam, an electric motor to operate said means, and means to control the operation of said motor, including a lamp, and means for illuminating any free globules of water carried by said steam, a photo-electric cell constructed and arranged to receive light reflected or refracted from water globules within said conduit, and a frequency-responsive device made operable by and in accordance with the amount of light falling upon said cell from said water globules whereby said motor is caused to operate said means for effecting a change in the water content of the steam to increase the water separated as the light reflected to said cell increases and decreases the amount of water separated as the light reflected to said cell decreases.

6. A photo-electric control device to control and regulate the amount of free water in steam flowing in a steam conduit comprising, a steam conduit, operable steam separating means within said conduit whereby the flow of steam is controlled and regulated to effect a separation of water from the steam, operable means to actuate said separating means, including an electric motor, controlling means to control the operation of said motor, said controlling means including, a light-sensitve cell, a frequency responsive device and a control switch, and means whereby light is reflected and refracted by any globules of water carried by said steam and caused to fall upon said light-sensitive cell thereby determining the amount of electric energy flowing through said cell, the operation of said frequency responsive device, and the operation of said motor and said steam separating means, to increase the amount of water separated from the steam when the reflected light increases and reducing the amount of water separated from the steam when the reflected light decreases.

7. A photo-electric control device to control and regulate the amount of free water in steam flowing in a steam conduit comprising, a steam conduit, operable steam separating means in said conduit whereby the flow of steam is controlled and regulated to effect a separation of water from the steam, operable means to actuate said separating means, including an electric motor, controlling means to control the operation of said motor, said controlling means including, a light sensitive cell, a frequency responsive device and a control switch, and means whereby light is reflected and refracted by any globules of water carried by said steam and caused to fall upon said light sensitive cell and through the coaction of said motor and said steam regulating means reduce the amount of water in the steam when increased amount of light reflected to said cell causes and increased activity of said frequency responsive device, and reverse the action of the motor and consequent reverse action of the steam separator when the amount of light reflected to said cell decreases and causes a reduced activity of said frequency responsive device.

8. A photo-electric control device to control and regulate the flow of steam to effect a change in the amount of water carried by said steam comprising, a steam conduit, an operable steam separating means in said conduit, means to actuate said separating means, including an electric motor, electrical means to control the operation of said motor including, a photo-electric cell constructed and arranged to receive and be influenced by light reflected from water globules in said steam when said globules are subjected to illumination, and a frequency responsive device in operative relation to said cell and by means of which through a motor control switch said motor may be energized to operate said steam operating means to reduce the amount of water in the steam or reverse with the consequent reverse effect on the steam as the amount of illuminated water globules varies and the light reflected therefrom to said cell varies.

9. A device for controlling the flow of steam to effect a change in the amount of free water carried by said steam including, an operable steam separator, operating means to actuate said separator including an electric motor, controlling means to control the operation of said motor, said controlling means including an electric control switch, a frequency responsive device operatively connected thereto and to control the operation of said switch, and a light sensitive cell in operative relation to said frequency responsive device constructed and arranged to receive light reflected from water globules in said steam when said globules are subjected to illumination, whereby through the coaction of the parts the amount of water in the steam is reduced when the increased amount of light reflected to said cell causes an increased activity of said frequency responsive device, and a reverse action results and less water is removed from the steam when a decreased amount of reflected light to said cell causes a decreased activity of said frequency responsive device.

10. A device for controlling the flow of steam to effect a change in the amount of vapor carried by the steam including, a steam conduit having a regulatable steam separating means therein, a photo-electric cell responsive to the amount of vapor carried in suspension by the steam after passing through the separator, and means controlled by the photo-electric cell for regulating the separator and arranged to vary the separating action of the separator directly with variations of the quantity of suspended liquid.

11. A control device to control and regulate the amount of water in flowing steam comprising, a steam conduit, a regulatable steam separator in said conduit, means whereby the vapor in the interior of said conduit is illuminated, a light-sensitive electric cell constructed and arranged to receive and being responsive to the amount of light reflected from the vapor carried in suspension by the steam after passing through the separator, and means controlled by the light-sensitive electric cell for regulating the separator and arranged to vary the separating action of the separator directly with the variations of the amount of light reflected from the suspended liquid.

CARL C. THOMAS.